United States Patent
Knoblauch

(10) Patent No.: US 8,335,752 B2
(45) Date of Patent: Dec. 18, 2012

(54) METHOD AND DEVICE FOR REALIZING AN ASSOCIATIVE MEMORY BASED ON INHIBITORY NEURAL NETWORKS

(75) Inventor: Andreas Knoblauch, Boehmenkirch (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 380 days.

(21) Appl. No.: 12/599,605

(22) PCT Filed: Jun. 20, 2008

(86) PCT No.: PCT/EP2008/005001
§ 371 (c)(1),
(2), (4) Date: Dec. 29, 2009

(87) PCT Pub. No.: WO2009/000474
PCT Pub. Date: Dec. 31, 2008

(65) Prior Publication Data
US 2010/0306145 A1 Dec. 2, 2010

(30) Foreign Application Priority Data
Jun. 22, 2007 (EP) .................. 07110870

(51) Int. Cl.
*G06N 3/04* (2006.01)
(52) U.S. Cl. ........................................ 706/27
(58) Field of Classification Search .............. None
See application file for complete search history.

(56) References Cited

U.S. PATENT DOCUMENTS

| 5,251,269 A | 10/1993 | Korner et al. |
| 2007/0033346 A1 | 2/2007 | Lemen et al. |
| 2010/0057452 A1* | 3/2010 | Mukerjee et al. ............. 704/232 |

FOREIGN PATENT DOCUMENTS
WO 03/015026 2/2003

OTHER PUBLICATIONS

Piazza, Uncini, Zenobi, "Neural Networks with Digital LUT Activation Functions", Proceedings of 1993 International Joint Conference on Neural Networks, 1993, pp. 1401-1404.*
Almeida, Idiart, Lisman, "Memory Retrieval Time and Memory Capacity of the CA3 Network: Role of Gamma Freqency Oscillations", Learning and Memory, vol. 14, 2007, pp. 795-806.*
Golomb, Rubin, Sompolinsky, "Willshaw Model: Associatie memory with sparse coding and low firing rates", Physical Review A, vol. 41, No. 4, 1990, pp. 1843-1854.*
Nather, "N-gram based Text Categorization", Comenius University, Bratislava, 2005, pp. 1-38.*
Shim, Kim and Choi, "Statistical-mechanical formulation of the Willshaw model with local inhibition", The American Physical Society, Physical REview A, vol. 43, No. 12, 1991, pp. 7012-7018.*

(Continued)

*Primary Examiner* — Kakali Chaki
*Assistant Examiner* — Walter Hanchak
(74) *Attorney, Agent, or Firm* — Squire Sanders (US) LLP

(57) ABSTRACT

A method for forming an associative computer memory comprises the step of forming an inhibitory memory matrix $A'=-(A_p-A)$. According to the Wilshaw model constructed from a given set of address patterns and content patterns' and random matrix structure.

9 Claims, 8 Drawing Sheets

(1) Learning (2) Recognition

OTHER PUBLICATIONS

H. J. Ryser, "Matrices of Zeros and Ones," XP-002490838, vol. 66, No. 6, Jan. 1, 1960, pp. 442-456.

H. J. Ryser, "Combinatorial Properties of Matrices of Zeros and Ones," XP008094944, vol. 9, Jan. 1, 1957, pp. 371-377.

Heiner Markert et al., Modelling of syntactical processing in the cortex, vol. 89, No. 1-3, May 6, 2007, pp. 300-315.

Rebecca Fay et al., Combining Visual Attention, Object Recognition and Associative Information Processing in a NeuroBotic System, vol. 3575, Aug. 12, 2005, pp. 118-143.

Andreas Knoblauch, "Synchronization and pattern separation in spiking associative memories and visual cortical areas", XP-002458566, Oct. 2003, a total of 19 pages.

A. Moopenn et al., Electronic Implementation of Associative Memory Based on Neural Network Models, XP-000743138, IEEE Transactions on Systems, Man and Cybernetics, vol. SMC-17, No. 2, Mar./Apr. 1987, pp. 325-329.

Jay Buckingham et al., "On setting unit thresholds in an incompletely connected associative net", vol. 4, No. 4, Nov. 1, 1993, pp. 441-459.

A. Knoblauch et al., Felix2 Annotated List, Dec. 31, 2005, XP-002458565, a total of 4 pages.

A. Knoblauch et al., "Neural associative memory for brain modeling and information retrieval", Information Processing Letters, vol. 95, No. 6, Sep. 20, 2005, pp. 537-544.

Rebecca Fay, Hierarchische neuronale Netze zur Klassifikation von 3D-Objekten, XP007905460, Master Thesis, Mar. 31, 2002, pp. 1-160.

\* cited by examiner

Fig. 1

(1) Learning patterns content patterns $v^\mu$: n=8, l=3

$u^1\backslash v^1$ : 1 0 1 0 1 0 0 0
$u^2\backslash v^2$ : 0 0 0 0 1 1 0 1 address patterns $u^\mu$: m=7, k=4

(memory matrix A)

(2) Pattern retrieval $\tilde{u}$ : 0 1 1 0 0 0 0

$\tilde{u}^1$ with $\lambda=2/4$; $\kappa=0$

A $\tilde{u}A$ : 2 0 2 0 2 1 0 1

$\hat{v}\ (\Theta=2)$ : 1 0 1 0 1 0 0 0

Fig. 2

(2a) Pattern retrieval in diluted excitatory network

| $\tilde{u}$ | | | | A' | | | | | |
|---|---|---|---|---|---|---|---|---|---|
| 0 | 1 | 0 | 1 | 0 | 1 | 0 | 0 | 0 | 0 |
| 1 | 0 | 1 | 0 | 0 | 1 | 0 | 0 | 0 | 0 |
| 1 | 1 | 0 | 1 | 0 | 0 | 1 | 0 | 0 | 1 |
| 0 | 1 | 0 | 0 | 0 | 1 | 1 | 0 | 1 | 1 |
| 0 | 0 | 0 | 0 | 0 | 0 | 1 | 1 | 1 | 1 |
| 0 | 0 | 0 | 0 | 0 | 0 | 0 | 0 | 0 | 0 |
| $x=\tilde{u}A'$ | 1 | 0 | 2 | 0 | 1 | 1 | 0 | 0 | |
| $a=\tilde{u}A_p$ | 1 | 2 | 2 | 2 | 1 | 2 | 1 | 1 | |
| $\hat{v}$ ($\Theta=a$) | 1 | 0 | 1 | 0 | 1 | 0 | 0 | 0 | |

$u^I$ with $\lambda=2/4$; $\kappa=0$ (2b) Pattern retrieval in diluted inhibitory network

| $\tilde{u}$ | | | | $A^I$ | | | | | |
|---|---|---|---|---|---|---|---|---|---|
| 0 | -1 | 0 | -1 | 0 | -1 | -1 | -1 | -1 | -1 |
| 1 | 0 | -1 | 0 | -1 | 0 | -1 | -1 | -1 | -1 |
| 1 | -1 | 0 | -1 | 0 | -1 | -1 | -1 | 0 | 0 |
| 0 | 0 | -1 | 0 | -1 | -1 | 0 | 0 | 0 | -1 |
| 0 | 0 | 0 | -1 | -1 | 0 | -1 | -1 | 0 | 0 |
| 0 | -1 | -1 | -1 | -1 | -1 | 0 | -1 | -1 | -1 |
| $x=\tilde{u}A^I$ | 0 | -2 | 0 | -2 | 0 | -1 | -1 | -1 | |
| $\hat{v}$ ($\Theta=0$) | 1 | 0 | 1 | 0 | 1 | 0 | 0 | 0 | |

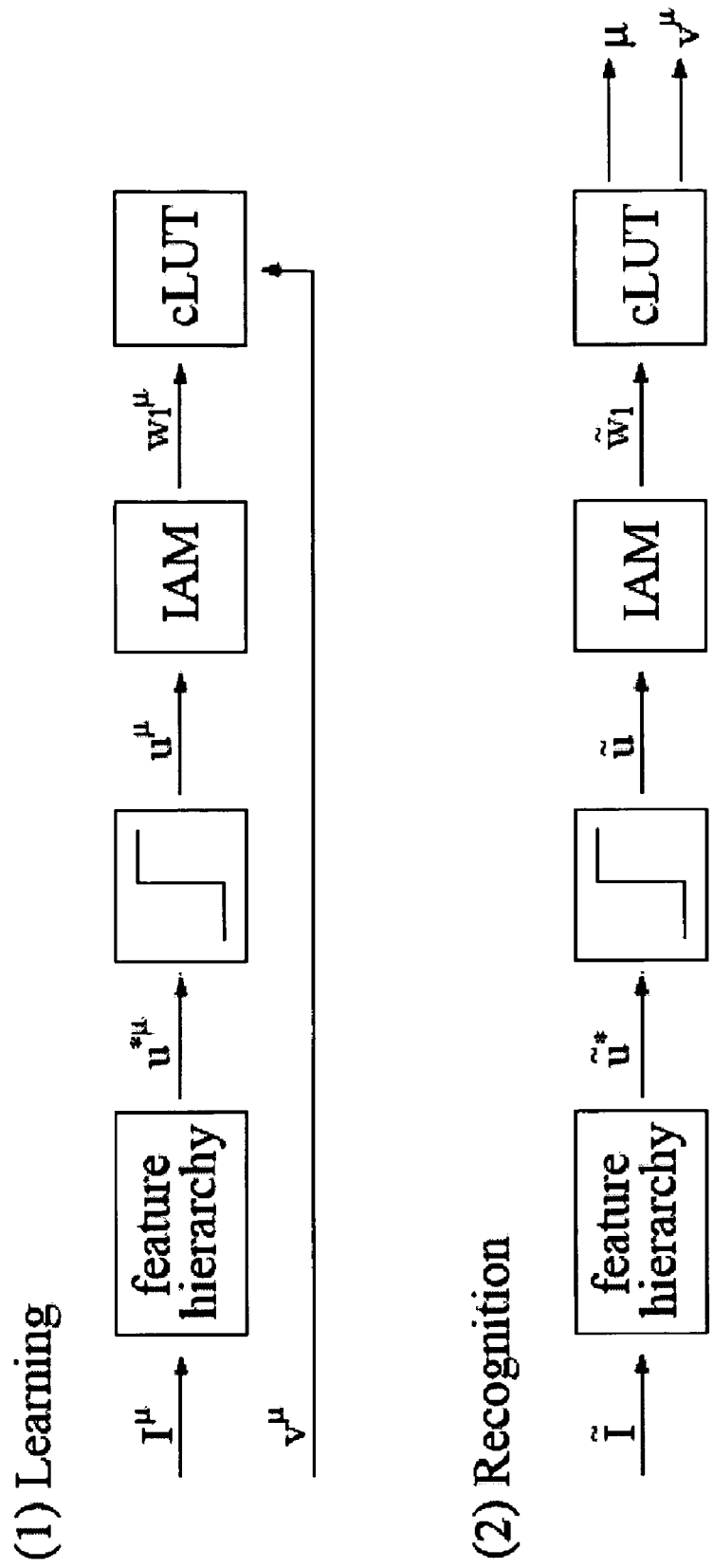

METHOD AND DEVICE FOR REALIZING AN ASSOCIATIVE MEMORY BASED ON INHIBITORY NEURAL NETWORKS

The present invention relates to a method and a device for realizing an associative memory using inhibitory neural networks.

TECHNICAL BACKGROUND AND PRIOR ART

It has long been pointed out that neural networks can compute mappings of the kind $f:u \mapsto v$, where u and v are usually interpreted as activity pattern vectors of the presynaptic and postsynaptic neuron populations, respectively. Actually, it has been proven that multilayer neural networks can approximate arbitrary functions $f$ with arbitrary precision (although this may require a very large neuron number in the hidden layers). Neural associative memory networks are a special case where the mapping is between discrete sets of address patterns $u^\mu$ and content patterns $v^\mu$, $\mu=1, \ldots, M$. Given a noisy address pattern $\tilde{u}$, the usual memory task is then to find the most similar $u^\mu$ minimizing $\|\tilde{u}-u^\mu\|$, and returning the corresponding content $v^\mu$. This task is essentially the best match or nearest-neighbor problem and can be extended to implement again continuous mappings $f$ by interpolating between several sample points. Efficient solutions to the best match problem have widespread applications such as object recognition, clustering or information retrieval in large databases.

STORING AND RETRIEVING PATTERNS IN THE WILLSHAW MODEL An attractive model of neural associative memory both for biological modeling and applications is the so-called Willshaw or Steinbuch model with binary neurons and synapses, illustrated in FIG. 1. Each address pattern $u^\mu$ is a binary vector of length m that, on average, contains k one-entries and m−k zero-entries. Similarly, each target pattern $v^\mu$ is a binary vector of length n that contains l one-entries and n−l zero-entries. Typically, the patterns are sparse, i.e., k<<m and l<<n.

FIG. 1 shows the working principle of the binary Willshaw model (for hetero-association). On the left hand side, during the learning phase, M associations between address patterns $u^\mu$ and content patterns $v^\mu$ are stored in the binary memory matrix A representing binary synaptic weights of the connection from address population u to content population v. Initially all synapses are inactive. During learning of pattern associations, the synapses are activated according to Hebbian coincidence learning (eq. 1). On the right hand side, for retrieval, an address pattern $\tilde{u}$ is propagated through the network. Vector-matrix-multiplication yields the membrane potentials $x=\tilde{u}A$. To obtain the retrieval result $\hat{v}$ (here equal to $v^1$) a threshold $\Theta$ is applied. For pattern part retrieval, $\tilde{u} \subset u^\mu$ one may simply choose the Willshaw threshold $\Theta=|\tilde{u}|$ yielding a superset $\hat{v} \supseteq v^\mu$ of the original pattern (i.e., no missing one-entries).

The M pattern pairs are stored hetero-associatively in a binary memory matrix $A_a \in \{0, 1\}^{m \times n}$, where $$A_{a,ij} = \min\left(1, \sum_{\mu=1}^{M} u_i^\mu \cdot v_j^\mu\right) \in \{0, 1\}. \tag{1}$$

The model may slightly be extended by allowing noisy one-entries and zero-entries in the matrix. Let $\tilde{A}_1$ and $\tilde{A}_0$ be two binary random m×n matrices, where each matrix entry is one independently with probability $\tilde{p}_1$ and $\tilde{p}_0$, respectively. Interpreting $\tilde{A}_1$ as the set of noisy one-synapses, and $\tilde{A}_0$ as the set of noisy zero-synapses, the resulting synaptic matrix is $$A=(A_a \vee \tilde{A}_1) \wedge \neg \tilde{A}_0 \in \{0,1\}. \tag{2}$$

After learning, the stored information can be retrieved applying an address pattern $\tilde{u}$. Vector-matrix-multiplication yields the neural potentials $x=\tilde{u}A$ of the target population, and imposing a threshold $\Theta$ gives the (one-step) retrieval result $\hat{v}$, $$\hat{v}_j = \begin{cases} 1, & x_j = \left(\sum_{i=1}^{m} \tilde{u}_i A_{ij}\right) \geq \Theta \\ 0, & \text{otherwise} \end{cases} \tag{3}$$

A critical prerequisite for high retrieval quality is the right choice of the threshold value $\Theta$: Too low values will lead to high rates of false one-entries (add-errors) whereas too high values will result in high rates of false zero-entries (miss-errors). This threshold choice can be simple or rather difficult, depending on the types of errors present in the address. In the following c and $f$ denote the number of correct and false one-entries in the address, respectively.

For $\tilde{p}_0=0$ and error-free addresses (c=k and $f=0$) or pattern part retrieval, that is, when the address contains miss errors only (c=λk and $f=0$ with 0<λ<1) the optimal threshold value is a simple function of the address pattern $\Theta=|\tilde{u}|$. This threshold value was used in the original Willshaw model and therefore it will be referred to as the Willshaw threshold. A detailed description of the Willshaw model may be found in the original article by D. J. Willshaw et al. ("Non-holographic associative memory", Nature, 222:960-962, 1969).

MEMORY LOAD First the memory load $p_1$ is determined, that is, the fraction of one-entries in the memory matrix. The probability that a synapse gets activated during learning of M pattern pairs is $$p_{1a} = 1 - \left(1 - \frac{kl}{mn}\right)^M \approx 1 - e^{-Mkl/mn}, \tag{4}$$

and therefore, considering the noisy synapses, the probability that a synapse is active is $$p_1 = 1 - \tilde{p}_0 - (1 - \tilde{p}_0)(1 - \tilde{p}_1)(1 - p_{1a}) \tag{5}$$
$$\geq p_{1,min} := 1 - \tilde{p}_0 - (1 - \tilde{p}_0)(1 - \tilde{p}_1)$$

$$p_{1a} = 1 - \frac{1 - \tilde{p}_0 - p_1}{(1 - \tilde{p}_0)(1 - \tilde{p}_1)} \tag{6}$$

$$M = \frac{\ln \frac{1 - \tilde{p}_0 - p_1}{(1 - \tilde{p}_0)(1 - \tilde{p}_1)}}{\ln(1 - kl/mn)} \approx -\frac{mn}{kl} \ln \frac{1 - \tilde{p}_0 - p_1}{(1 - \tilde{p}_0)(1 - \tilde{p}_1)}. \tag{7}$$

RETRIEVAL ERRORS AND HIGH FIDELITY Let the noisy address pattern $\tilde{u}$ contain c correct one-entries of $u^\mu$ and an additional noise with $f$ false one-entries. Then for a given threshold $\Theta$ the probability $p_{01}$ of an add-error and the probability $p_{10}$ of a miss-error are $$p_{01}(\Theta) = p(\hat{v}_i = 1 \mid v_i^\mu = 0) \quad (8)$$

$$= \sum_{x=\Theta}^{c+f} p_{WP,lo}(x; k, l, m, n, M-1, \tilde{p}_1, \tilde{p}_0, c, f)$$

$$p_{10}(\Theta) = p(\hat{v}_i = 0 \mid v_i^\mu = 1) \quad (9)$$

$$= \sum_{x=0}^{\Theta-1} p_{WP,hi}(x; k, l, m, n, M-1, \tilde{p}_1, \tilde{p}_0, c, f)$$

where $p_{WP,lo}$, is the potential distribution of the "low" units (corresponding to the zero-entries of $v^\mu$) and $p_{WP,hi}$ is the potential distribution of the "high" units (corresponding to the one-entries of $v^\mu$).

The retrieval or output noise $\epsilon$ may be defined according to the expected Hamming distance $d_H$ between $\hat{v}$ and $v^\mu$. Normalizing to the pattern activity l, one obtains $$\epsilon(\Theta) := \frac{Ed_H(\hat{v}, v^\mu)}{l} = \frac{n-l}{l} p_{01}(\Theta) + p_{10}(\Theta) \quad (10)$$

An alternative definition based on the information I and transinformation (or mutual information) T of a binary channel is $$\epsilon^T(\Theta) := 1 - \frac{T(l/n, p_{01}, p_{10})}{I(l/n)}. \quad (11)$$

The latter definition is particularly useful when analyzing low quality retrieval for sparse patterns with $l \ll n$. The former definition is useful because it allows an elegant analysis for pattern capacity and storage capacity. Now the optimal threshold $\Theta_{opt} \in \{0, 1, \ldots, c+f\}$ can be defined by minimizing $\epsilon$ (or $\epsilon^T$). For $\epsilon \ll 1$, "high-fidelity" retrieval is obtained.

STORAGE CAPACITY Now, the maximal number of patterns $M_\epsilon$ may be computed such that the retrieval noise is at most $\epsilon$. Since the minimal Hamming distance (optimizing $\Theta$) is obviously increasing with M, the pattern capacity $M_\epsilon$ (on quality level $\epsilon$) may be defined as $$M_\epsilon := \max\{M : (n-l)p_{01} + lp_{10} \leq \epsilon l\}. \quad (12)$$

Considering the Shannon information of individual content patterns, one obtains the normalized network storage capacity in bits per synapses, $$C_\epsilon := \frac{\text{stored information}}{\# \text{ synapses}} = \frac{M_\epsilon T(v^\mu; \hat{v}^\mu)}{mn} \approx \frac{M_\epsilon T(l/n, p_{01}, p_{10})}{m} \quad (13)$$

where $T(v^\mu; \hat{v}^\mu)$ is the transinformation (or mutual information) between learned and retrieved content pattern. From the network capacity, further performance measures may be derived such as synaptic capacity $C^S$ and information capacity $C^I$ making use of the compressibility of the memory matrix for a memory load $p_1 \neq 0.5$, $$C_\epsilon^S := \frac{\text{stored information}}{\# \text{ non-silent synapses}} = \frac{C_\epsilon}{\min(p_{1\epsilon}, 1 - p_{1\epsilon})}, \quad (14)$$

$$C_\epsilon^I := \frac{\text{stored information}}{\# \text{ bits of required physical memory}} = \frac{C_\epsilon}{I(p_{1\epsilon})}, \quad (15)$$

where $p_{1\epsilon}$ is the memory matrix load after storing M pattern pairs, and $I(p_{1\epsilon}) := -p_{1\epsilon} \mathrm{ld} p_{1\epsilon} - (1 - p_{1\epsilon}) \mathrm{ld}(1 - p_{1\epsilon})$ is the Shannon information of a memory matrix component. Essentially, $C^S$ normalizes the stored information to the number of non-silent synapses (instead of all synapses). The variable $C^S$ is relevant for VLSI implementations of the Willshaw model where each synapse, similar to biology, must be realized in hardware. Similarly, $C^I$ normalizes the stored information to the amount of physical memory that is actually required to represent the memory matrix. This is relevant mainly for technical applications where the Willshaw matrix must be maintained in the memory of digital computers.

APPROXIMATIVE ANALYSIS OF RETRIEVAL WITH THE WILLSHAW THRESHOLD For retrieval with maximal "Willshaw" threshold $\Theta = |\tilde{u}|$ there is an elegant analysis based on a binomial approximation of the error probabilities. Unfortunately this is useful only for $\tilde{p}_0 = 0$, i.e., no noisy zero-entries in the memory matrix, and $f = 0$, i.e., no false one-entries in the address pattern $\tilde{u}$ (pattern part retrieval). In that case when $c = |\tilde{u}| = \lambda k$ and $l = 0$ the probability of miss noise is $p_{10} = 0$ and the probability of add-noise can be approximated $$p_{01} \approx p_1^{\lambda k} \quad (16)$$

assuming independently generated one-entries in the memory matrix and $\lambda := c/k$. This assumption becomes correct in the limit of large networks for many cases. Requiring high fidelity level $\epsilon$ one obtains the bound $p_{01} \leq \epsilon l/(n-l)$. Resolving for $p_1$ the high fidelity memory load $p_{1\epsilon}$ is obtained, and from this the high fidelity capacities, $$p_{1\epsilon} \approx \left(\frac{\epsilon l}{n-l}\right)^{\frac{1}{\lambda k}} \overset{(!)}{\geq} p_{1,\min} \Leftrightarrow k \approx \frac{\mathrm{ld}\frac{\epsilon l}{n-l}}{\lambda \mathrm{ld} p_{1\epsilon}} \overset{(!)}{\geq} k_{\min} := \frac{\mathrm{ld}\frac{\epsilon l}{n-l}}{\lambda \mathrm{ld} p_{1,\min}} \quad (17)$$

$$M_\epsilon \approx \lambda^2 \cdot (\mathrm{ld} p_{1\epsilon})^2 \cdot \ln\frac{1 - p_{1\epsilon}}{1 - \tilde{p}_1} \cdot \frac{k}{l} \cdot \frac{mn}{\left(\mathrm{ld}\frac{n-l}{\epsilon \cdot l}\right)^2} \text{ for } p_{1\epsilon} \geq p_{1,\min} \quad (18)$$

$$C_\epsilon \approx \lambda \cdot \mathrm{ld} p_{1\epsilon} \cdot \ln\frac{1 - p_{1\epsilon}}{(1 - \tilde{p}_1)} \cdot \eta \text{ for } p_{1\epsilon} \geq p_{1,\min} \quad (19)$$

where $\eta$ is usually near 1, $$\eta := \frac{T\left(\frac{l}{n}, \frac{\epsilon l}{n-l}, 0\right)}{-\frac{l}{n} \mathrm{ld}\frac{\epsilon l}{n-l}} \approx \frac{1}{1 + \frac{\ln \epsilon}{\ln(l/n)}}. \quad (20)$$

Note that equation 17 implies a minimal assembly size $k_{min}$ for the address population. For smaller assemblies it is impossible to achieve high-fidelity $\epsilon$, even when storing only a single association.

SPARSE AND DENSE POTENTIATION The main conclusions from the binomial approximative analysis are that a very high storage capacity of almost 0.7 bits per synapse can be achieved for sparse patterns with $k \sim \log n$ and memory load $p_1 = 0.5$. Then, one may store on the order of $M \sim mn/(\log n)^2$ pattern associations with high retrieval quality. From equations 17 and 19 it is easy to see that asymptotically $$C > 0 \Leftrightarrow k \sim \log n \Leftrightarrow 0 < p_{1\epsilon} < 1. \quad (21)$$

Thus, the analysis suggests that neural associative memory is efficient (C>0) only for logarithmically sparse patterns. For sub-logarithmic sparse patterns with k/log n→0 one has $p_1$→0 and for super-logarithmic sparse patterns with k/log n→∞ one has $p_1$→1, both cases implying vanishing network storage capacity $C_\epsilon$→0.

In the following, the three cases $p_1$→0/c/1 will be referred to as sparse, balanced, and dense synaptic potentiation.

It should be noted that this conclusion may be biased by the definition of network storage capacity, and alternative definitions of storage capacity considering the compressibility of the network lead to different conclusions. For example, in technical implementations of the Willshaw model the memory matrix can be compressed for $p_1$→0/1 and the (information) storage capacity improves by factor $I(p_1):= -p_1 ldp_1 - (1-p_1)ld(1-p_1)$. This leads to the definition of "compression" capacities $C^I := C/I(p_1)$ and $C^S := C/\min(p_1, 1-p_1)$ (see eqs. 14,15,19).

Interestingly, and in contrast to network capacity C, optimizing $C^I$ and $C^S$ reveals highest capacities for $p_1$→0 and $p_1$→1. By this the regimes with ultrasparse and moderately sparse patterns (or cell assemblies) have gained increased attention.

However, the convergence of the binomial approximations towards the exact values may be questionable. In particular, for dense potentiation with $p_{0\epsilon}=1-p_{1\epsilon}$→0, supra-logarithmic sparseness, k/log n→∞, and $$p_{1\epsilon} = \left(\frac{\epsilon l}{n-l}\right)^{1/\lambda k} = e^{\frac{\ln(\epsilon l/(n-l))}{\lambda k}} \approx 1 - \frac{\ln\frac{n-l}{\epsilon l}}{\lambda k}, \quad (22)$$

$$M_\epsilon = \frac{\ln(1-p_{1\epsilon})}{\ln\left(1-\frac{kl}{mn}\right)} \approx -\frac{mn}{kl}\left(\ln(\lambda k) - \ln\ln\frac{n-l}{\epsilon l}\right) \approx \frac{mn\ln k}{kl}, \quad (23)$$

numerical simulations of small networks reveal that the capacities can be massively overestimated by the binomial approximative analysis. Nevertheless, the inventor has shown in an asymptotic analysis for large networks, that the binomial approximative analysis from above becomes exact at least for $k=O(n/\log^2 n)$. That means, the regime of dense potentiation leads actually to high performance networks for a very broad range of pattern activities.

THE (EXCITATORY) DILUTED WILLSHAW MODEL In the following, it will be assumed that, on average, only a fraction p of the mn synapses are actually realized in the network. More precisely, it is assumed that a potential synapse is realized with probability p independently of other synapses. In other words, it is assumed that the network is incompletely connected.

Obviously, this case is already included in the theoretical framework presented above by using $\tilde{p}_0 = 1-p$. For the sake of brevity, the matrix of realized synapses will be denoted as $$A_p := 1 - \tilde{A}_0 \quad (24)$$

Unfortunately, as already mentioned, for p<1 there is no obvious optimal threshold anymore. Instead, the threshold needs to be adjusted "by hand". For example, if the statistics of the address pattern (c and f) are known, one can optimize the threshold in order to minimize the expected Hamming distance (eq. 10,11). However, numerical evaluations indicate that the performance of this naive implementation of the excitatory Willshaw model becomes quite bad for p<1. In particular, the synaptic storage capacity vanishes, C→0, for p→0.

Previous works have focused on finding optimal threshold strategies for diluted networks. It has been suggested to choose thresholds $\Theta_j$ individually for each content neuron j as a function of the so-called input activity $$\theta_j := \sum_{i=1}^{m} \tilde{u}_i A_{p,ij}, \quad (25)$$

defined as the number of active address neurons connected to neuron j (see FIG. 2, left panel). Simply using $\Theta_j = \theta_j$ corresponds to the previous Willshaw threshold and again implies $p_{10}=0$, i.e., no miss-noise in the retrieval result. For pattern part retrieval with f=0 (no add-noise in the address pattern), this threshold strategy is optimal if, besides input activity, no further information is used. However, for an excitatory interpretation this strategy has a severe disadvantage: for technical applications, the matrix $A_p$ of realized synapses must be represented explicitly, which inevitably decreases storage capacity. This becomes particularly severe for $p_1$→0 or $p_1$→1 when A can be compressed. Then memory requirements are dominated by $A_p$ and therefore storage capacity vanishes.

In the following, the two model variants with the naive threshold control (described at the beginning of this section) and the optimal threshold control (eq. 25) will be referred to as the naive and optimal excitatory diluted Willshaw model, respectively.

In the light of these analyses, it is an object of the present invention to provide an improved method and device for realizing an associative memory on the basis of a neural network.

This object is achieved according to the invention by a method and a device for forming an associative memory according to the independent claims. Advantageous embodiments are defined in the dependent claims.

The associative memory is a digital computer memory that may be formed or realized by building up a corresponding matrix or structure in the digital memory of a general-purpose digital computer or physically implemented on a parallel (VLSI, FPGA) hardware architecture.

The method and device according to the invention have the following advantages:

The threshold strategy becomes very simple, even when using the input activity in diluted networks: For example, assume that the optimal threshold of the excitatory model is $\Theta_j = \theta_j + c$ for an offset c. Then the optimal threshold for the inhibitory model is simply c, i.e., again independent of the individual input activities.

Consequently, it is not necessary to explicitly represent $A_p$ which can dramatically increase the storage capacity if A can be compressed.

Further aspects and advantages of the present invention will become more apparent to the person skilled in the art when considering the following detailed description, in connection with the annexed drawing in which FIG. 1 shows the working principle of the binary Willshaw model (for hetero-association);

FIG. 2 shows learning and retrieval in incompletely connected excitatory and inhibitory Willshaw networks;

FIG. 3 compares the retrieval quality of a model according to the invention to the naive excitatory model for a network of a given size;

FIG. 4 shows asymptotic network capacity, synaptic capacity and information capacity as functions of memory load for an optimal excitatory model and the inhibitory model according to the invention;

FIG. 5 compares the structures of a two-layer Willshaw model and a three-layer extension;

FIG. 8 shows a block diagram of a system for visual object recognition using an associative memory according to one embodiment of the invention.

DETAILED DESCRIPTION OF THE INVENTION

Figure 3:
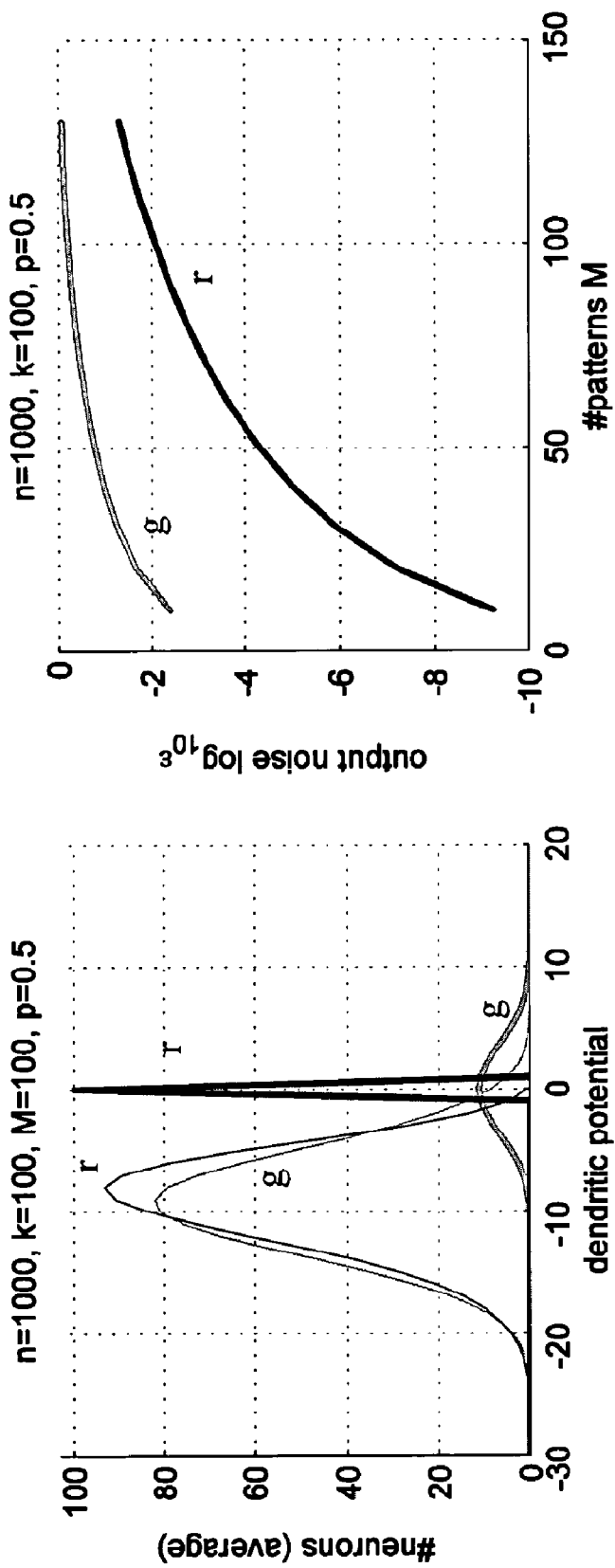

A method for forming an associative computer memory according to the invention uses an inhibitory interpretation of the Willshaw model.

THE INHIBITORY WILLSHAW MODEL The excitatory Willshaw model has an equivalent inhibitory interpretation corresponding to Anti-Hebbian learning that avoids the problems of the excitatory model described in the previous section. Consider retrieval in the common excitatory interpretation with memory matrix A (eq. 2), address pattern ũ, and (possibly individual) thresholds Θ (see eqs. 3,25). Further, let $\theta = \tilde{u} A_p$ be the vector of input activities (eq. 25). Then the corresponding inhibitory model is defined by the inhibitory memory matrix $A^I$ and retrieval threshold $\Theta^I$ with $$A^I = -(A_p - A) a_{ij}^I \in \{0, -1\} \quad (26)$$

$$\Theta^I = \Theta - \theta \quad (27)$$

The excitatory and inhibitory models are actually equivalent. I.e., the retrieval results for the excitatory and inhibitory models are identical (see FIG. 2, right panel) because $$\tilde{u}(A_p - A_p + A) \geq \Theta \Leftrightarrow \theta - \tilde{u}(A_p - A) \geq \Theta \Leftrightarrow \tilde{u} A^I \geq \Theta^I. \quad (28)$$

These arguments are illustrated in FIG. 2 showing learning and retrieval in incompletely connected Willshaw networks (p=0.8) of the excitatory and inhibitory type.

The left hand part (2a) of FIG. 2 shows pattern retrieval in a diluted excitatory network according to the state of the art. The natural generalization of the one-step algorithm for pattern part retrieval (with $f=0$ add-noise) has to apply a threshold $\Theta_j$ equal to the input activity $\theta_3$ for each target neuron j (see eq. 25).

The right hand part (2b) of FIG. 2 shows pattern retrieval in a diluted inhibitory network according to a first embodiment of the invention. In the inhibitory Willshaw model 0-synapses of the excitatory model become −1-synapses, and 1-synapses become 0-synapses. The inhibitory and excitatory models are functionally equivalent, but optimal threshold control in the inhibitory model is much simpler: here each neuron has the same threshold $\Theta^I = 0$.

Also the analysis of diluted inhibitory networks becomes very simple. A missing synapse may be replaced by a 0-synapse (see FIG. 2). In the equivalent excitatory model, this becomes a noisy 1-synapse. Thus, the inhibitory model with connectivity p and synaptic noise $\tilde{p}_0, \tilde{p}_1$ is equivalent to the fully connected excitatory model with synaptic noise $$\tilde{p}_0 = \tilde{p}_1^I \quad (29)$$

$$\tilde{p}_1 = 1 - p(1 - \tilde{p}_0^I) \quad (30)$$

Thus, for $\tilde{p}^I = 0$ the inhibitory diluted model can be analyzed as described above, leading to interesting asymptotic results (eqs. 17-23).

Retrieval Quality

FIG. 3 shows retrieval quality of the inhibitory model ('r' for red) as compared to the naive excitatory model ('g' for green) for a network with m=n=1000, k=l=100 and connectivity p=0.5 when addressing with c=50 correct and no false units (f=0).

The plot on the left hand side shows the distribution of the dendritic potentials for the low units (thin) and high units (thick) when M=100 pattern associations are stored corresponding to a memory load $p_1 = 0.817$ (or $p_{1a} = 0.634$; see eq. 4). The x-axis for the dendritic potentials is shifted such that 0 corresponds to the optimal threshold in each case. The inhibitory model achieves optimal retrieval quality for $\Theta = 0$ resulting in error probabilities $p_{01} = 0.000944$, $p_{10} = 0$ and output noise $\epsilon = 0.00850$ (see eq. 10). The excitatory model is optimal for $\Theta = 25$ resulting in $p_{01} = 0.0208$, $p_{10} = 0.444$, and thus a much higher output noise $\epsilon = 0.631$.

The plot on the right hand side shows minimal output noise $\epsilon$ (see eq. 10) as a function of the number M of stored associations.

As illustrated by FIG. 3, for diluted networks with p<1 the retrieval quality of the inhibitory model is generally much better than for the naive excitatory model. The plots indicate that, for the same number M of stored pattern associations, the output noise $\epsilon$ (see eq. 10) is much worse for the excitatory model. Correspondingly, if a fixed retrieval quality $\epsilon$ must be maintained, the inhibitory model can store a much larger number of patterns, i.e., it has a much larger storage capacity.

Storage Capacity

The analysis of maximal memory load $p_{1\epsilon}$ and pattern capacity $M_\epsilon$ for both the inhibitory diluted Willshaw model and the excitatory model with optimal threshold control is essentially the same as the analysis of the fully connected excitatory model described before (see eqs. 29,30). For example, if connectivity p is assumed, but no synaptic noise, then, for pattern part retrieval without add-noise in the address pattern, ($\epsilon = 0$) one may just use eqs. 17,18 with $\tilde{p}_0 = 0$ and $\tilde{p}_1 = 1 - p$. Since now the network has only pmn synapses the storage capacity $C_\epsilon$ of eq. 19 improves by factor 1/p, $$C_\epsilon := \frac{T}{pmn} \approx \lambda \cdot \frac{ld\, p_{1\epsilon} \cdot \ln \frac{1 - p_{1\epsilon}}{p}}{p} \cdot \eta \text{ for} \quad (31)$$

$$p_{1\epsilon} \geq p_{1,min} := 1 - p$$

where T was used for the stored (trans-) information which is proportional to $M_\epsilon$.

Similarly, the "compression capacities" $C^S$ and $C^I$ may be computed (see eqs. 14,15). The different capacities for the different model variants are summarized in the table shown below. For the synaptic capacity $C^S$ performance may be improved by eliminating all silent synapses. Thus $C^S$ improves by a factor $1/p_{1\epsilon}'$ for the naive excitatory model, and by a factor $1/(1 - p_{1\epsilon})$ for the inhibitory model. Note that the optimal excitatory model has only factor 1/p, the same as in eq. 31, because here one cannot eliminate the 0-synapses since they are required to compute the input activity eq. 25. For the information capacity $C^I$ it was assumed that the memory matrix, interpreted as a bit stream, can be compressed by a Huffman or Golomb code. Thus, the improvement for the naive excitatory and the inhibitory model is factor $1/I(p_{1\epsilon}')$ and $1/I(p_{1\epsilon})$, respectively, but only factor $1/I(1-p, 1-p_{1\epsilon})$ for the optimal excitatory model: here a fraction $1-p$ of the potential synapses is missing, another fraction $1 - p_{1\epsilon}$ are zero, and the remaining synapses are 1.

The following table shows storage capacity C, synaptic capacity $C^S$, and information capacity $C^I$ (see eqs. 13-15) for the different implementations of the Willshaw model (naive excitatory model, optimal excitatory model, and inhibitory model). mn is network size, $p \leq 1$ is connectivity, $p_{1\epsilon}$ is memory load, and $T_\epsilon$ denotes the maximal storable information under a given quality constraint $\epsilon$. The asymptotical approximations follow from eq. 31. For the naive excitatory model, the storable information $T_\epsilon'$ and the corresponding memory load $p_{1\epsilon}'$ are usually smaller than for the optimal model variants. I(p) and I(p, q) are the information of a binary and ternary random variable, respectively. The formulae are correct also for full connectivity (p=1) except for the synaptic capacity $C_\epsilon^S$ of the optimal excitatory model: here p should be replaced by $p_{1\epsilon}$ in the denominator.

ties. The excitatory model performs particularly good for sparse potentiation with memory load $p_{1\epsilon} \to 0$ and very sparse patterns k/log $n \to 0$, while the inhibitory model achieves highest capacities for dense potentiation with $p_{1\epsilon} \to 1$ and moderate sparseness k/log $n \to \infty$. However, for diluted networks with $p<1$ only the inhibitory model achieves high capacities $C^S$ and $C^I$.

Computational Complexity

The time complexity of the Willshaw model is essentially the number of synaptic operations necessary to perform a retrieval. Obviously, this is an important performance measure for technical implementations on sequential digital computers.

|  | naive exc. | opt. exc. | | inhibitory | |
|---|---|---|---|---|---|
| $C_\epsilon$ | $\dfrac{T_\epsilon'}{pmn}$ | $\dfrac{T_\epsilon}{pmn} \approx$ | $\dfrac{ld p_{1\epsilon} \ln \dfrac{1-p_{1\epsilon}}{p}}{p}$ | $\dfrac{T_\epsilon}{pmn} \approx$ | $\dfrac{ld p_{1\epsilon} \ln \dfrac{1-p_{1\epsilon}}{p}}{p}$ |
| $C_\epsilon^S$ | $\dfrac{T_\epsilon'}{p'_{1\epsilon}mn}$ | $\dfrac{T_\epsilon}{pmn} \approx$ | $\dfrac{ld p_{1\epsilon} \ln \dfrac{1-p_{1\epsilon}}{p}}{p}$ | $\dfrac{T_\epsilon}{(1-p_{1\epsilon})mn} \approx$ | $\dfrac{ld p_{1\epsilon} \ln \dfrac{1-p_{1\epsilon}}{p}}{1-p_{1\epsilon}}$ |
| $C_\epsilon^I$ | $\dfrac{T_\epsilon'}{I(p'_{1\epsilon})mn}$ | $\dfrac{T_\epsilon}{I(1-p, 1-p_{1\epsilon})mn} \approx$ | $\dfrac{ld p_{1\epsilon} \ln \dfrac{1-p_{1\epsilon}}{p}}{I(1-p, 1-p_{1\epsilon})}$ | $\dfrac{T_\epsilon}{I(p_{1\epsilon})mn} \approx$ | $\dfrac{ld p_{1\epsilon} \ln \dfrac{1-p_{1\epsilon}}{p}}{I(p_{1\epsilon})}$ |

(30)

Although there is no (elegant) theory for the naive excitatory model, numerical evaluations indicate that it always performs bad. The hope that the naive excitatory model performs well for sparse potentiation with $p_{1\epsilon} \to 0$ and sub-logarithmic sparse patterns is true only for p=1.

Figure 4:
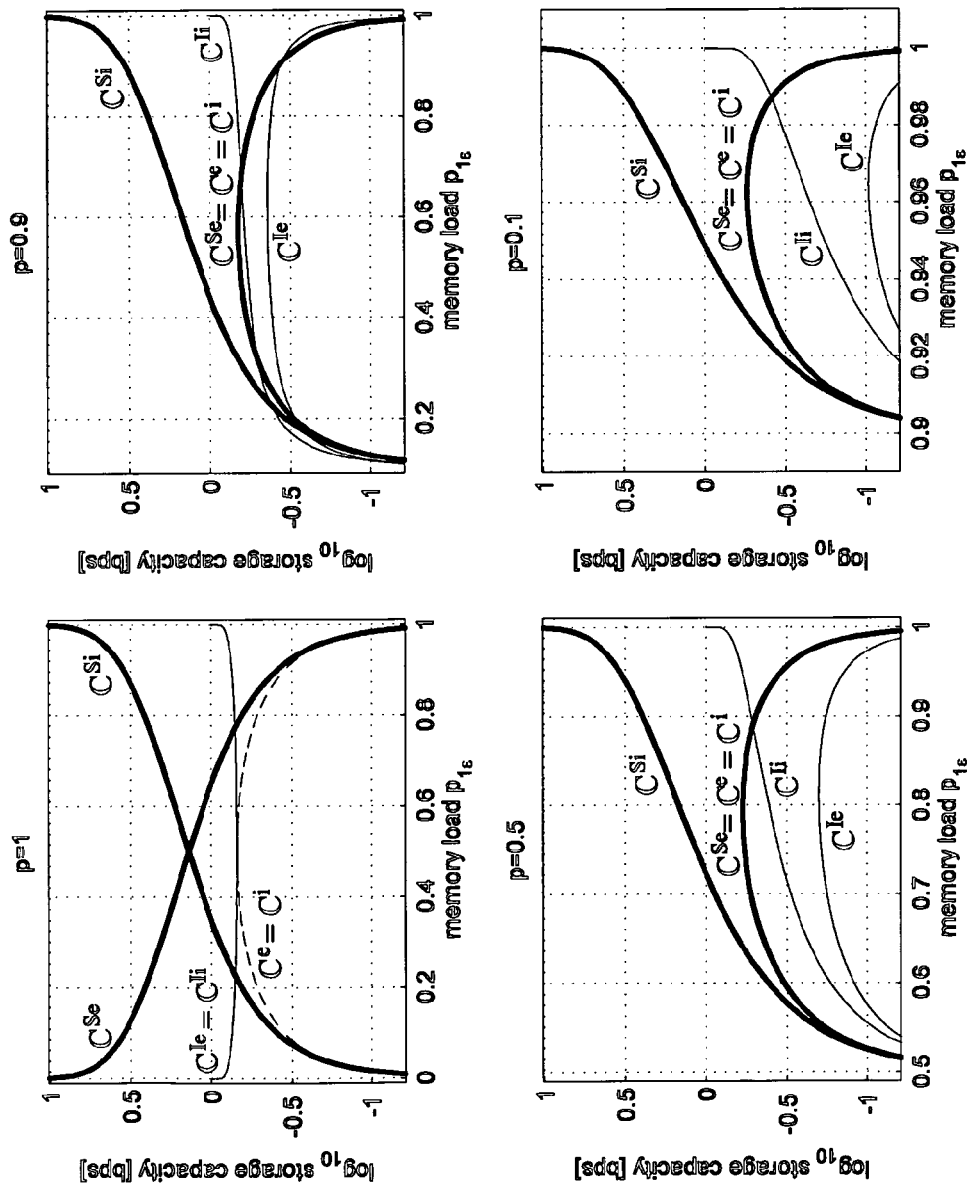

FIG. 4 shows asymptotic network capacity C, synaptic capacity $C^S$, and information capacity $C^I$ as functions of the memory load $p_{1\epsilon}$ (see the above table) for different network connectivities p. The curves show the capacities $C^{Se}$ (=$C^e$ for $p<1$), $C^{Ie}$ for the optimal excitatory model and the corresponding capacities $C^i$ (=$C^e$), $C^{Si}$, $C^{Ii}$ for the inhibitory model. For p=1 (upper left panel) the dashed line shows $C^e$ (=$C^i$) which differs here from $C^{Se}$. For p<1 only the inhibitory model can achieve large capacities $\geq 1$ bps.

Based on these results the following points can be made:

The network capacity C (no compression) of the inhibitory model is identical to the excitatory model and yields moderately high capacities for balanced potentiation.

In the regime of sparse potentiation with $p_{1\epsilon} \to 0$ high compression capacities $C^S$, $C^I$ can only be achieved in the fully connected network. Here the excitatory model is superior over the inhibitory model with $C^S \to \infty$ and $C^I \to 1$.

However, for diluted networks sparse potentiation with $p_{1\epsilon} \to 0$ is not viable for two reasons: First, compressibility of the memory matrix is limited by $A_p$. Second, hifi-retrievals on level $\epsilon$ are not possible for $p_{1\epsilon} 0$ because this would imply k/log $n \to 0$ (section), while in fact k must grow at least with log n (see eq. 17 for $p_{1,min}=1-p$).

In the regime of dense potentiation with $p_{1\epsilon} \to 1$ high capacities $C^S$, $C^I$ are achieved only by the inhibitory model. Here $C^{Si} \to \infty$ and $0.85 \leq \lim C^{Ii} \leq 1$ even for the diluted networks with $p \to 0$. In contrast, the capacities of the excitatory models are low.

In summary, for full network connectivity (p=1) both the excitatory and the inhibitory model can achieve high capaci- The time complexity for learning is the same for all model variants, i.e., learning the pattern associations requires time $$t_{lrn} = Mkl \approx -mn\ln\frac{1-p_1}{p} \tag{32}$$

Also a naive retrieval (with uncompressed memory matrix) for an address pattern with $z:=|\tilde{u}|$ active units requires the same time for all three model variants, $$t_{ret}^{nv} = zn \tag{33}$$

Similarly as for storage capacity, performance can be improved if the silent synapses are skipped. Thus, the retrieval times $t_{ret}^{ne}$, $t_{ret}^{e}$, $t_{ret}^{i}$ for the naive excitatory, the optimal excitatory, and the inhibitory model variants are $$t_{ret}^{nve} = znp_1 \tag{34}$$

$$t_{ret}^{e} = znp \tag{35}$$

$$t_{ret}^{i} = zn(1-p_1) \tag{36}$$

assuming that only the functionally relevant synapses are explicitly represented, for example in target lists.

The following conclusions can be made:

The excitatory models are advantageous for sparse potentiation with $p_{1\epsilon} \to 0$, but the optimal excitatory model has only minor advantages for fixed p<1.

In contrast, the inhibitory model is always advantageous for dense potentiation with $p_{1\epsilon} \to 1$ and any connectivity p.

Thus, the inhibitory model can be adapted to the number of patterns to be stored: If, for given m, n, k, and l, the actual number M of patterns to be stored is smaller than $M_\epsilon$, then one may decrease the network connectivity from full connectivity to an appropriate value p<1 such that $M=M_\epsilon(p)$. This will decrease retrieval time while maintaining a desired retrieval quality and high storage capacity.

Comparison to Compressed Look-Up Tables

Figure 5:
Figure 5:
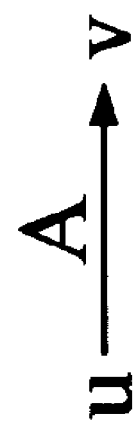

A common way to implement associative memory is simply by a look-up table where each pattern association $u^\mu \to v^\mu$ is explicitely stored in one of the table's rows. While the Willshaw model is a two-layer neural network, look-up-tables have an interpretation as three-layer neural networks (see FIG. 5) with an additional hidden "grandmother cell" layer w. Here each address pattern $u^\mu$ is stored in a separate row of the M×m synaptic matrix U describing the connection from u to w. Similarly, each content pattern $v^\mu$ is stored in a row of the M×n synaptic matrix V describing the connection from w to v.

Retrieval is straight forward: An address pattern $\tilde{u}$ is multiplied with the first synaptic matrix U giving the potentials of layer-w neurons. Then, the winner neuron with the largest potential is selected and the corresponding content pattern is returned as retrieval result.

Previous work has pointed out that the Willshaw network can implement retrieval of sparse patterns much more efficiently than naive implementations of look-up-tables. However, look-up-tables can become very efficient if adequately compressed (e.g., by Huffman or Golomb coding). Here it is essential to compress the columns (and not the rows) of the first synaptic matrix U. Then a compressed look-up-table (cLUT) has an information capacity $C^I \to 1$ and a retrieval requires only $$t_{seq}^{cLUT} = z \cdot M \cdot k/m \qquad (37)$$

steps. Comparing with the fully connected compressed Willshaw model (see eqs. 34,36) storing the same pattern number M (eq. 7 with $\tilde{p}_0 = \tilde{p}_1 = 0$) this yields $$v := \frac{t_{seq}^{cLUT}}{t_{seq}^{cW}} \approx \frac{-\ln(1-p_1)}{l \cdot \min(p_1, 1-p_1)} \leq \frac{-\ln(1-p_{1\epsilon})}{l \cdot \min(p_{1\epsilon}, 1-p_{1\epsilon})} \qquad (38)$$

$$\to \begin{cases} 1/l, & p_{1\epsilon} \to 0 \\ \lambda \cdot \frac{k}{l} \cdot \frac{\ln(\lambda k) - \ln\ln\frac{n}{el}}{\ln\frac{n}{el}}, & p_{1\epsilon} \to 1, \end{cases} \qquad (39)$$

where used $1-p_{1\epsilon} \approx \ln p_{1\epsilon}$ was used for $p_{1\epsilon} 1$ (see eq. 22). Remember that the memory matrix is sparse ($p_{1\epsilon} \to 0$), balanced ($0 < \delta < p_{1\epsilon} < 1-\delta$), or dense ($p_{1\epsilon} \to 1$) for sub-logarithmic, logarithmic, or supra-logarithmic k(n) (see eq. 21).

Thus the Willshaw model outperforms the cLUT only for dense potentiation ($p_{1\epsilon} \to 1$) if implemented with inhibitory neurons (eq. 36). The advantage of the inhibitory Willshaw model is most significant for asymmetric networks with large k and small l. If it is required that m=n and k=l (e.g., for auto-association) the Willshaw model is superior with $v \to \lambda d/(1-d)$ only for almost linear $k=n^d$ with $1/(1+\lambda) < d < 1$.

The model proposed in the next section makes use of the inhibitory Willshaw model operating in the most efficient regime of dense potentiation ($p_{1\epsilon} \to 1$) and asymmetric pattern activities (l<<k).

A Four Layer System for Information Retrieval

Figure 6:
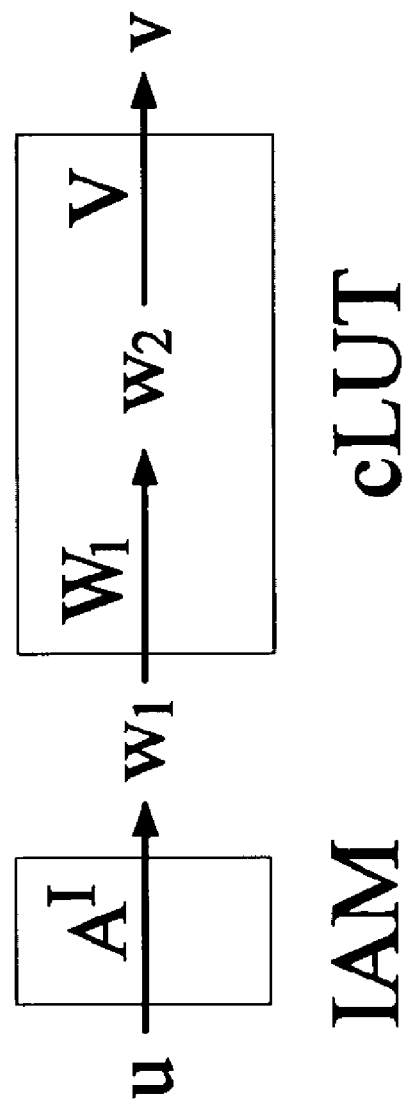
FIG. 6 shows a four-layer system for information retrieval according to one embodiment of the invention.

FIG. 6 shows four layer system for information retrieval according to an embodiment of the invention. The first projection from address population u to the first intermediary population $w_1$ is the inhibitory Willshaw associative memory (IAM). The second and third projection from $w_1$ to another intermediary population $w_2$ and the content population v is a compressed look-up table (cLUT) as described in the previous section. If the address patterns $u^\mu$ are not extremely sparse (as is usually the case in applications), then retrieval in this four layer model is much faster than in a compressed look-up table.

The motivation for this model comes from the following observations:

The address patterns $u^\mu$ are typically not as sparse as required for an efficient implementation of a compressed look-up table (or the inferior excitatory Willshaw model). For example, it might typically be assumed that $k=m^d$ with d typically around 0.5.

Here the inhibitory model has major advantages over the compressed look-up-table, in particular if the activity l of the content patterns $v^\mu$ would be extremely low.

However, l grows typically on the same order as k, for example k=l for auto-association. By introducing an intermediary layer $w_1$ with random patterns $w_1^\mu$, this layer may be chosen as sparse as desired. Let $n_1$ be the size and $l_1$ the pattern activity of layer $w_1$. Then, one may choose, for example, $l_1=2$ and $$n_1 \approx \frac{Mkl_1}{m\ln k} \qquad (40)$$

Here, $n_1$ was chosen by resolving eq. 23 for n. That means the intermediary layer $w_1$ is designed as small as possible to guarantee high fidelity. If M and thus $n_1$ grow not too fast, i.e., $$\frac{k}{\log n_1} \to \infty \Leftrightarrow \frac{\log M}{k} \to 0 \qquad (41)$$

then one actually obtains dense potentiation (eq. 17). The retrieval time for this first projection is then (see eqs. 36,22)

$$t_{ret}^{w1} \approx z n_1 \frac{\ln\frac{n_1}{el_1}}{\lambda k} \approx n_1 \ln n_1 \approx \frac{Mkl_1 \ln M}{m \ln k} \qquad (42)$$

What remains is a projection from the very sparse $w_1$ population to the content population v. This can most efficiently be implemented by a compressed look-up table via a second intermediary grandmother cell population $w_2$ with one cell for each of the M associations. Note that this second projection can correct possible errors induced by the first projection. The additional retrieval time is $$t_{ret}^{w2} \approx \frac{l_1^2 M}{n_1} \approx \frac{l_1 m \ln k}{k} \qquad (43)$$

Thus the total retrieval time $t_{ret}^{w1} + t_{ret}^{w2}$ is dominated by the first part $t_{ret}^{w1}$ if $$M \gg \frac{\left(\frac{m\ln k}{k}\right)^2}{\ln M} \quad (44)$$

or, for typically $k=m^d$, for $M \gg m^{2-2d} \ln m$.

Thus, for sufficiently large M the relative efficiency of this four layer model compared to a compressed look-up table is typically $$\frac{t_{ret}^{w1}}{t_{seq}^{cLUT}} \approx \frac{Mkl_1 \ln M}{\frac{m\ln k}{\lambda M k^2}} \sim \frac{\ln M}{k \ln k} \sim \frac{1}{k} \quad (45)$$

This shows that the four layer system requires typically only a fraction $m^{-d}$ of the look-up table's retrieval time. Similarly, the relative efficiency of this four layer model compared to the two-layer inhibitory Willshaw model is (see eqs. 42,36,22)

$$\frac{t_{ret}^{w1}}{t_{ret}^i} \approx \frac{n_1 \ln \frac{n_1}{el_1}}{n \ln \frac{n}{el}} \approx \frac{n_1 \ln n_1}{n \ln (n/l)} \quad (46)$$

which assumes that M corresponds to the maximal pattern capacity $M_\epsilon$ of the two-layer model (for example by adapting the connectivity p). Thus, the four layer model is faster than the two-layer inhibitory Willshaw model at least for $n_1 < n$. Moreover, a big advantage of the four layer model is that the number M of storable patterns does not depend on the content pattern statistics, l and n. In particular, in the four layer model, an arbitrary number of patterns can be stored (by increasing the size $n_1$ of the intermediary layer $w_1$), while the pattern capacity of the inhibitory Willshaw model is limited by equation 18.

This massive improvement of retrieval time comes at the price of storing the M random patterns of the $w_1$ population two times: First, (implicitly) in the inhibitory Willshaw matrix A. Second, in the matrix $W_1$ of the look-up table. Since the information capacity of the inhibitory Willshaw model will be near 1 the required memory is approximately $$T = 2Mn_1 I(l_1/n_1) \quad (47)$$

$$\approx 2Ml_1 ld n_1 \quad (48)$$

$$\approx 2l_1 M \log M \quad (49)$$

which is typically negligible in comparison to the memory necessary for representing the original address patterns, Mk log m, because $k \gg l_1$ and typically log M~log m (if M does not grow faster than polynomial in m).

Note that in the four layer system there is actually no need to explicitly storing the address patterns $u^\mu$. Thus, for a hetero-associative scenario one would even save memory compared to the three-layer look-up-table.

Model Variants and Optimizations

Using Compressed Diluted Look-Up-Tables

The four-layer architecture introduced above makes use of an inhibitory associative network as the first processing stage. It may be shown that the inhibitory network is more efficient than a compressed look-up table for many parameters, in particular for those required in the four-layer system (i.e., extremely sparse population $w_1$). However, depending on the address pattern statistics and the number of pattern associations it may be sometimes better to use a diluted look-up table instead of the inhibitory network. Both model variants have in common that they speed-up retrieval by introducing an intermediary cell layer with very specific and sparse (i.e., grandmother-cell-like) response properties.

Optimizing the Intermediary Representations: UUU and USU Networks

The analysis of the inhibitory Willshaw network relies on a binomial approximation of the retrieval error probability. This approximation can lead to a significant overestimation of the performance of the Willshaw network's performance, in particular for small finite networks or if the address patterns are not sufficiently sparse.

However, for the four-layer system, the intermediary pattern representations of layer $w_1$ (see FIG. 6) may be optimized in order to minimize error probabilities. In the standard model the patterns $w_1^\mu$ are generated at random with size $n_1$ and activity $l_1$ (see eq. 40). Thus the so-called unit usage of a $w_1$ neuron is approximately binomially distributed with parameters M and $l_1/n$ (the unit usage of a neuron is defined as the number of patterns a neuron belongs to).

In the four-layer-system one may choose the intermediary $w_1$ patterns arbitrarily, for example, in such a way that the unit usages are approximately equal for all $w_1$ neurons. In other words, the matrix $W_1$ may be optimized such that the unit usage is approximately uniform in the sense that the variance $E((uu[j] - Ml_1/n_1)^2)$ is minimized, wherein E is the expectation over j and $Ml_1/n_1$ is the mean unit usage. This can be realized, for example, by the following greedy-algorithm:

1. ALGORITHM UUU: Given M, $n_1$, $l_1$ create M binary patterns $w_1^\mu$ of size $n_1$ and activity $l_1$ with uniform unit usage, i.e., $uu[j] := \Sigma_{\mu=1}^{M} w_1^\mu[j]$ is (approximately) identical for all $j = 1, \ldots, n_1$.
2. for $j := 1$ to $n_1$ do $uu[j] = 0$ endfor
3. for $\mu := 1$ to M do
4.     $j_1, \ldots, j_{l_1} :=$ the $l_1$ neurons with the lowest unit usages uu
5.     $w_1^\mu := \{j_1, \ldots, j_{l_1}\}$
6.     for $i := 1$ to $l_1$ do $uu[j_i] := uu[j_i] + 1$ endfor
7. endfor Explorative numerical simulations show that this choice of $w_1$ patterns can significantly decrease the true error probability $p_{01}$.

In a further embodiment of the invention, there is a second possible approach that may decrease the error probability $p_{01}$ even below the binomial approximation $p_{01}$: Instead of creating a pattern set with uniform unit usage, one could also create a pattern set with what may be called (approximately) uniform synapse usage. Here the synapse usage of content neuron j is defined as the number of active (1-)synapses on the dendrite of neuron j (assuming full connectivity with p=1), $$su[j] := \sum_{i=1}^{m} A_{ij} = m - \sum_{i=1}^{m} A_{ij}^I \quad (50)$$

where A and $A^I$ are the memory matrices (eq. 2 and eq. 26) of the excitatory and inhibitory interpretations of the Willshaw model, respectively.

Again, approximating identical synapse usages means minimizing the variance $E((su[j]-E(su[j]))^2)$ of the synapse usages, wherein E is again the mean value over j.

One possible greedy algorithm for creating a pattern set with approximately uniform synapse usage is the following:

---

1. ALGORITHM USU: Given M, $n_1$, $l_1$ and M binary pattern vectors $u^\mu$. Then create M binary patterns $w_1^\mu$ of size $n_1$ and activity $l_1$ with uniform synapse usage, i.e., su[j] is (approximately) identical for all j = 1,...,$n_1$ (see eq. 50).
2. A := 0
3. for j := 1 to $n_1$ do su[j] := 0 endfor
4. for μ := 1 to M do
5.     $j_1,...,j_{l_1}$ := the $l_1$ neurons with the lowest synapse usages su
6.     $w_1^\mu$ := {$j_1,...,j_{l_1}$}
7.     for i ∈ $u^\mu$ do for j ∈ $w_1^\mu$ do
8.         if($A_{ij}$ == 0)
9.             $A_{ij}$ := 1
10.           su[j] := su[j] + 1;
11.        endif
12.     endfor endfor
13. endfor

---

Note that in lines 6,7, the binary pattern vectors $u^\mu$ and $w_1^\mu$ are identified with the sets of their active (1-)components. Also note that this algorithm is obviously not able to create a pattern set with really uniform synapse usage. Nevertheless the greedy algorithm is fast (for small $l_1$) and will create a pattern set such that the variance of synapse usage is smaller than for pure random patterns. This property is one reason why the resulting error probability $p_{01}$ is actually smaller than the binomial estimate eq. 16.

In a variant of the USU algorithm ("USU2") the minimization in line 5 may be performed on the synapse usages $su'[j]:=su[j]+\Sigma_{i=0}^m (1-A_{ij})u_i^\mu$, anticipating the storage of pattern $u^\mu$. This algorithms leads indeed to very good performance with error probabilities well below the binomial approximation eq. 16. However, this variant has the disadvantage of creating a much higher number of "collisions" in layer $w_1$ (i.e., where two n-patterns are mapped to the same $w_1$ pattern). This would cause retrieval of superpositions in the out output layer v.

Therefore, in yet another variant of the USU algorithm ("USU3"), the minimization process of line 5 actively avoids units that may lead to collisions. More particularly, each of the stimulus patterns $u^\mu$ may be mapped to a corresponding random pattern $w_1^{\mu 1}$ in layer w1. The natural meaning of collision is that two different stimulus patterns are mapped to the same random pattern, very similar to the meaning of a collision in hash algorithms. More precisely, two random patterns $w_1^{\mu 1}$ and $w_1^{\mu 2}$ may be said to collide if they are equal.

In general, the performance of the four-layer system becomes better if $w_1^{\mu 1}$ and $w_1^{\mu 2}$ have minimal overlap. The USU3 algorithm computes a set of random patterns $w_1^\mu$(p=1, . . . , M) such that both synapse usage and overlaps (and thus number of collisions) between random patterns are minimal. This way, USU3 leads to lowest output noise level in the inventive four layer system (see FIG. 7):

---

1. for i := 1 to m do for j := 1 to $n_1$ do $A_{ij}$ := 0;
2. for μ := 1 to M do
3.     for j := 1 to $n_1$ do patW1[j] := 0; endfor
4.     for j := 1 to $n_1$ do su'[j] := $\Sigma_{i=1...m}(A_{ij} + (1-A_{ij})*u_i^\mu)$ endfor;
5.     for $\mu_1$ := 1 to μ - 1 do fullOvlp[?1] := 1; endfor;
6.     for b := 1 to $l_1$ do
7.         if (b = 0) then -continued 8.         for j := 1 to $n_1$ do frb[j] := 0;
9.        else
10.         for j := 1 to $n_1$ do frb[j] := $V_{\mu_1=1...\mu-1}$(fullOvlp[$\mu_1$]∧ $w_{1j}^{\mu 1}$);
11.        endif;
12.        minsu := min{su'[j] : j = 1...n1;patW1[j] = 0; frb[j] = 0}
13.        minsulist := list of indices j with patW1[j]=0, frb[j]=0, su'[j]=minsu;
14.        if (minsulist is empty) then
15.            minsulist := list of indices j with patW1[j] = 0 and su'[j] = minsu;
16.        endif
17.        if (minsulist is empty) then
18.            minsulist := list of indices j with patW1[j] = 0;
19.        endif
20.        j1 := random element in minsulist;
21.        patW1[j1] := 1;
22.        for $\mu_1$ := 1 to μ - 1 do
23.            if (overlap(patW1, $w_1^{\mu 1}$) < b) then fullOvlp[$\mu_1$] := 0; endif;
24.        endfor;
25.        for i := 1 to m do if ($u_i^\mu$ > 0) then
26.            $A_{ij1}$ := 1;
27.        endif; endfor;
28.     endfor
29.     $w_1^\mu$ := patW1;
30. endfor;

---

Line (1) initializes the memory matrix A. The main loop of lines (2)-(30) computes the random patterns, i.e., the μ-th loop run computes pattern $w_1^\mu$. Line (3) initializes the array patW1 corresponding to 4. Line (4) computes the "anticipated" synapse usage su'. I.e., su'[j] is the synapse usage of neuron j after storing the μ-th pattern $u^\mu$ assuming neuron j is active in pattern $w_1^\mu$.

Line (5) initializes the binary array fullOvlp. The case fullOvlp[$\mu_1$]=0 indicates that previously generated pattern $w_1^{\mu 1}$ does not collide with the current pattern patW1, i.e., the two patterns do not have full overlap. In each run b of the loop defined by lines (6)-(28) one active component of patW1 is computed. Lines (7)-(11) compute a binary array frb where frb[j]=1 indicates that it is "forbidden" to activate neuron j in patW1. Forbidden neurons are essentially those that are already active in patW1 or have full overlap with one of the previous patterns.

Line (12) computes the minimal (anticipated) synapse usage. Line (13) computes a list minsulist of neurons that are not already active in patW1, are not forbidden, and have minimal synapse usage. In case the resulting list is empty, lines (14)-(16) re-compute the list without excluding forbidden neurons. In case the resulting list is still empty, lines (17)-(19) re-compute the list considering any neurons that is still inactive in patW1. Line (20) chooses one element j1 at random from the resulting list. Line (21) activates patW1[j1]; Lines (22)-(24) update fullOvlp. Lines (25)-(27) updates the memory matrix A. Line (29) sets $w_1^\mu$ equal to the currently computed pattern patW1.

This variant performs almost as well as the previous variant but produces no more collisions than choosing the $w_1$-patterns at random.

Figure 7:
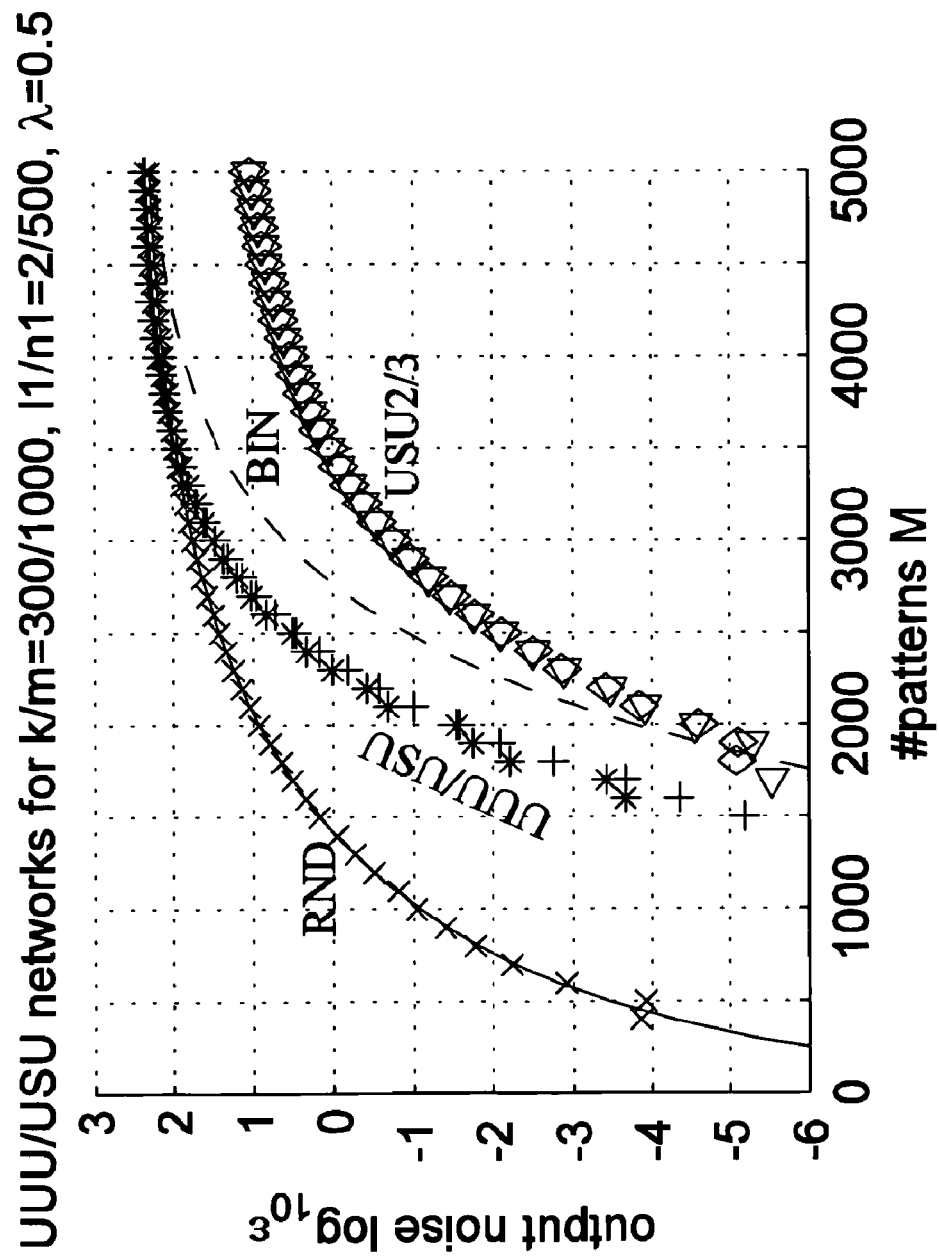
FIG. 7 shows the improvement regarding storage capacity and retrieval quality in a system shown in FIG. 6.

FIG. 7 shows improving storage capacity and retrieval quality of the four-layer system (Fig.) by using UUU/USU networks. The first layer u stores patterns with m=1000 and k=300. The intermediary layer $w_1$ stores patterns with The plot shows output noise ϵ over number of stored patterns M for an address layer u with k/m=300/1000, an intermediary layer $w_1$ with $l_1/n_1$=2/500 when addressing with half address patterns (i.e., c=150, f=0). The different curves correspond to different methods to construct the patterns in layer $w_1$: RND: Standard model with random patterns. Solid line corresponds to the exact theory, crosses (x) to simulations. Dashed line corresponds to output noise as predicted by the binomial approximation eq. 16. UUU: Patterns are constructed using the uniform-unit-usage algorithm UUU (star). USU: Patterns are constructed using the uniform-synapse-usage algorithm USU (plus). USU2/3: Patterns are constructed using two optimized versions of the USU algorithm (triangle, diamond). Note that for these algorithms output noise is much less than predicted by the binomial approximation.

FIG. 7 summarizes data from numerical simulations showing that UUU and USU networks generally perform much better than the standard Willshaw network. For the same number M of stored patterns the probability of an retrieval error can be reduced by several orders of magnitude. Correspondingly, for given error level $\epsilon$ the pattern capacity $M_\epsilon$ increases significantly. For example, for an error level of $\epsilon=10^{-2}$ the UUU/USU algorithms increase pattern capacity by more than factor two, and USU2/3 even more than factor three. Most interestingly, USU2/3 lead to significantly better results than predicted by the binomial approximation eq. 16: The error probability can be decreased by more than factor 10, and, correspondingly, also the pattern capacity $M_\epsilon$ is significantly increased, in particular for relatively low-fidelity (e.g., by almost 30 percent for $\epsilon=1$). This means that the performance of the four-layer system should be seen rather as a lower bound.

The present invention proposes a neural network architecture for solving the following best match problem: Given a database $\{(u^\mu \mapsto v^\mu): \mu=1, \ldots, M\}$ of M associations from address patterns $u^\mu$ to content patterns $v^\mu$, and a usually noisy address pattern $\tilde{u}$ the memory task is to find the index $\mu$ (and the corresponding content $v^\mu$) such that the distance $d(\tilde{u}, u^\mu)$ is minimal.

The best match problem is also known as nearest-neighbor-search and efficient solutions have widespread applications. More particularly, the described "four-layer system for information retrieval" described in relation to FIG. 6 has beneficial applications in object recognition systems that rely on large databases of sparse prototype patterns. In particular, the system according to the invention can decrease both retrieval time and memory requirements by several orders of magnitude.

More particularly, similar to the brain, state-of-the-art visual object recognition systems transform sensory inputs to a very high-dimensional but sparse feature vector representation, i.e., where most of the vector components are zero or near zero.

Online-learning of new objects or object views often works in such a way that appropriate snapshots are stored as high-dimensional feature vectors in a large database together with the corresponding object label. Object recognition can then be accomplished by comparing new sensory input to the information stored in the database. That means, the classification system must find the database feature vector most similar to the feature vector from the sensory input.

If a large number of object or object views has been learned in the database, the nearest-neighbor-search can become a bottleneck. Here efficient solutions to the best match problem as proposed here can contribute to build efficient object recognition systems.

FIG. 8 shows a block diagram of a system for visual object recognition, having the same hierarchical structure and function as the visual object recognition system described by Wersing and colleagues (cf. H. Wersing, E. Koerner. Learning optimized features for hierarchical models of invariant object recognition. Neural Computation, 15:1559-1588, 2003; S. Kirstein, H. Wersing, E. Koerner: A biologically motivated visual memory architecture for online learning of objects. Neural Networks, 21(465-77, 2008).

The hierarchical object recognition system consists of several neural layers extracting features of increasing complexity. On each hierarchical stage, the neurons learn an optimal feature set according to the sparse coding paradigm (cf. B. A. Olshausen, D. J. Field: Sparse coding with an overcomplete basis set: A strategy employed by V1? Vision Research, 37:3311-3325, 1997) to represent inputs from the previous stage. After completing feature learning, the system can be used for object learning and classification. The basic role of the system is to transform each input image I (usually containing an object to be classified) in the lowest input layer to a sparse (but still gradual) activation vector u* in the highest layer.

During learning a set of M input images $I^\mu$ with associated object labels $v^\mu$ is presented to the network resulting in a set of activation vectors $u^{*\mu}$ at the highest layer ($\mu=1, \ldots, M$). Now the data set ($u^{*\mu}, v^\mu$) can be used to train a standard classifier on top of the hierarchy, employing, for example, perceptrons or prototype-based methods such as LVQ.

According to the invention, this standard classifier on top of the hierarchy may be replaced or complemented by the inventive four-layer system. In particular, simple threshold elements may be used to transform the gradual patterns $u^{*\mu}$ (or the prototypes extracted by LVQ) into binary patterns $u^\mu$.

In one embodiment of the invention, a single threshold may be chosen for all neurons such that the mean activity of a pattern vector was k, where k was chosen small compared to the vector size m to get sparse binary pattern vectors. Alternatively, thresholds may also be chosen individually for each neuron such that each neuron becomes activated M/k times. Or the k most excited neurons may be activated in each pattern. In any case, the resulting set of binary address patterns $u^\mu$ may then be associated with the object labels $v^\mu$ employing the inventive four-layer-system as described above.

During retrieval, a given input image $\tilde{I}$ may be classified using the above hierarchy and the most similar training example (or prototype) may be returned. For that, $\tilde{I}$ may be transformed to a binary pattern $\tilde{u}$, in the same way as during learning, by propagating $\tilde{I}$ through the feature hierarchy and then through the threshold elements. Finally, $\tilde{u}$ may be used for best match retrieval in the inventive four layer system as described above, and the best matching $\mu$ and $v^\mu$ may be returned.

OTHER POTENTIAL APPLICATIONS include the following ones:

These arguments can be applied not only for visual object recognition, but of course also for any other recognition task that is based on a database of sparse high-dimensional feature vectors (e.g., auditory speech recognition, etc.).

Potential applications include efficient implementations of LVQ (Learning Vector Quantification) if the pattern vectors are high-dimensional and sparse and if a very large number of pattern vectors must be stored.

Similarly, potential applications include efficient implementations of clustering algorithms or self-organizing maps if the number of cluster prototypes is large and the prototype vectors are high-dimensional and sparse.

Another potential application is document retrieval: Here the database may consists of a large set of text documents, for example taken from the internet. Each text document consists of (possibly many) words and can be indexed by selecting a relatively small set of key words. The result is a sparse binary feature vector for each text document. Given a query consisting of a set of key words the task is to find the most relevant documents. This retrieval can be accelerated by the methods proposed here.

A complementary idea is to represent the words in a text document by applying an N-gram code. For example the 1-grams (or monograms) of the word "memory" are simply the letters "m", "e", "m", "o", "r", "y". Similarly, the 2-grams (or digrams) are "me", "em", "mo", "or", "ry", and the 3-grams are "mem", "emo", "mor", "ory". By that one obtains very naturally a sparse and fault tolerant code alrady at the word level. For example, for an alphabet of 26 letters, the 2-gram code represents the word "memory" by a binary vector of dimension $26^2=676$ where only 5 components are active. This method can be used, for example, to implement a fault-tolerant code for the keywords described in the previous item. Additionally, the N-gram method can be used to code keyword order and key word sequences in a manner suitable for the associative memory models discussed in this application.

The inhibitory neural networks and algorithms proposed in this application would be particularly efficient if implemented on a parallel (VLSI) hardware architecture. Since current parallel hardware is not very flexible with respect to online-learning, it may still be useful to create parallel hardware implementations for special applications. For example, to implement the best-match-search of a readily learned object recognition system in hardware (VLSI, FPGA, etc.).

In summary, the inhibitory neural networks and algorithms proposed in this application can be used for any application involving the best match or nearest-neighbor problem if the underlying pattern vectors are high-dimensional and sparse.

The invention claimed is:

1. A computer implemented method for storing and recognizing patterns using an associative memory, the method comprising the steps of:
   a) accepting an input address pattern $\tilde{u}$;
   b) computing an associative memory by computing an inhibitory memory matrix ($A^I$) by coding synaptic weights 0 and −1 according to the following equation:

$$A^I = -(A_P - A),$$

wherein A is a memory matrix according to a Willshaw associative memory format constructed from a set of address pattern vector ($u^\mu$) of length m and content pattern vector ($v^\mu$) of length n, the set having M number of pattern pairs and $A_P$ being a random matrix of size, m×n;
   c) compressing the matrix $A^I$ or pruning synapses with weight 0;
   d) computing a vector of retrieval results $\tilde{u}*A^I$;
   e) applying a threshold calculated as follows:

$$\Theta^I = \Theta - \theta,$$

where $\Theta$ is a set of thresholds for the underlying Willshaw associative memory (A), and $\theta$ is a vector of input activities, and the random matrix $A_P$ describes a diluted neural network structure in which only a fraction of synapses is realized between neurons of the neural network structure;
   f) computing a set of sparse random patterns ($w^\mu$), the random patterns having size $n_I$ and having $l_I$ active components, wherein the size $n_I$ is calculated according to the following formula:

$$n_1 \approx \frac{Mkl_1}{m \ln k},$$

where k is the average of the sum of 1's in an input address vector ($u^\mu$) over a given set of input address vectors ($u^\mu$);
   g) computing a sparse random matrix ($W_I$) using the M pairs of sparse random patterns ($w^\mu$);
   h) computing a compressed lookup-table (cLUT) using the sparse random matrix ($W_I$);
   i) selecting a retrieval result from the vector of retrieval results for output; and
   j) outputting the retrieval result.

2. The method according to claim 1, wherein step b) comprises the steps of:
   forming an inhibitory memory matrix ($A^I$) from the address pattern vector ($u^\mu$) of length m and the content pattern vector ($w^\mu$) of length n; and
   forming a content pattern matrix (V) using the content pattern vector ($v^\mu$),
   wherein the set has M number of sparse random pattern pairs.

3. The method according to claim 2, wherein for computing the compressed lookup-table (cLUT) the sparse random matrix and the content pattern matrix ($W_1$, V) are used.

4. The method according to claim 1, wherein, in each random pattern ($w_1^\mu$) of the sparse random matrix ($W_1$), only two components are active ($l_1=2$) allowing a minimal size $n_1$.

5. The method according to claim 1, further comprising the steps:
   applying the threshold as defined in claim 1 in order to obtain a first intermediate retrieval result $\tilde{W}_1$; and
   forming a vector of second intermediate retrieval results $\tilde{W}_2 := W_1 \tilde{W}_1$,
   wherein the μ-th line of the content pattern matrix (V) is selected as the final output result and wherein μ is the maximal component of $\tilde{W}_2$.

6. The method according to claim 1, wherein the retrieval result is output and used for automatic visual object recognition or automatic auditory speech recognition.

7. The method according to claim 1, wherein the retrieval result is output and used for document retrieval.

8. The method according to claim 7, wherein the words in the document are represented by applying an N-gram code.

9. The method according to claim 1, wherein the computer used for implementing the method is adapted for parallel processing.

* * * * *